United States Patent Office 3,642,924
Patented Feb. 15, 1972

3,642,924
PROCESS FOR PRODUCING CYCLIC TRIMERS OF DIENES
Hiroyuki Morikawa, Inashiki-gun, Japan, assignor to Mitsubishi Petrochemical Company Limited, Tokyo-to, Japan
No Drawing. Filed Aug. 13, 1969, Ser. No. 849,912
Claims priority, application Japan, Aug. 23, 1968, 43/59,817
Int. Cl. C07c 3/02, 3/10, 3/18
U.S. Cl. 260—666 B
9 Claims

ABSTRACT OF THE DISCLOSURE

Cyclotrimerization of a diene is catalyzed by a catalyst which comprises a combination of
(1) a titanyl compound representable by the general formula $TiOX_2$ wherein X is a halogen or an OR group wherein R is a hydrocarbon radical, and
(2) a dialkylaluminium halide.

BACKGROUND OF THE INVENTION

This invention relates generally to processes for producing cyclic trienes by cyclotrimerization of 1,3-dienes. More particularly, it relates to such a process in which a specific catalyst is employed.

Catalytic cyclotrimerization of 1,3-dienes is known, and many investigations have heretofore been made relative thereto, whereby a process in which a catalyst comprising a combination of a certain titanium compound and a certain organoaluminium compound is used.

The conventional catalyst comprising a combination of a titanium compound and an organoaluminium compound, however, has a feature such that in the catalyst of higher activity, the titanium compound used is often less stable and is difficult to handle on an industrial scale, whereas when a more stable titanium compound is used the resulting catalyst is often less active.

Further, some combinations of the titanium compound-organoaluminium compound catalytic system are less effective in the cyclotrimerization of methyl-substituted butadiene such as pentadiene and isoprene, although they are effective in the trimerization of butadiene.

SUMMARY OF THE INVENTION

It is an object of this invention to overcome the above-described drawbacks found generally in the titanium compound-organoaluminium compound catalyst system.

The object is attained by the use of a catalyst system of above-described type in which a specific titanium compound is employed.

According to the present invention, there is thus provided a process for producing a cyclic trimer of a diene through catalytic cyclotrimerization of a 1,3-diene which comprises carrying out the reaction under the catalytic influence of a catalyst which comprises a combination of a titanyl compound representable by the general formula $TiOX_2$ wherein X is a member selected from the group consisting of halogens and OR groups wherein R is a hydrocarbon radical, and a dialkylaluminium halide.

The titanium compound used in the present catalytic system is thus the titanyl compound. The Ti=O bond in this titanyl compound is more stable for safe handling than that in the prior titanium compounds. Further, the nature of the titanyl compound in the catalyst of the invention is unique in that the catalyst of the invention has a tendency to provide a better yield of a cyclic trimer of methyl-substituted 1,3-diene than that attainable by the use of some of the conventional or similar titanium compounds as a titanium component instead of the titanyl compound of the present invention, as demonstrated in the reference runs in Examples 3, 5, and 6, and in Reference Examples 1 and 2.

The titanyl compound to be used with expectation of the above effects is one representable by the general formul hereinbefore described. Typical examples of compound are those having chlorine or bromine as a halogen X and having in the OR group an alkyl group, preferably a lower alkyl group containing, for example, 1 to 4 carbon atoms, and an aryl group, preferably phenyl and tolyl. Typical examples thereof are, for example, titanyl dimethoxide, titanyl diethoxide, titanyl di-n-propoxide, titanyl diisopropoxide, titanyl diphenoxide, titanyl dichloride, and titanyl dibromide.

The other component to produce the present catalyst is a dialkylaluminium halide. Typical dialkylaluminium halides are those wherein the alkyl is a lower alkyl containing, for example, 1 to 4 carbon atoms, and the halogen is chlorine, typical examples of which are dimethylaluminium monochloride, diethylaluminium monochloride, diisopropylaluminium monochloride, di-n-propylaluminium monochloride, and dibutylaluminium monochloride.

The ratio of the components to be used in the present catalyst is, in general, approximately 1 to 50 expressed in terms of a mole ratio of aluminium compound/titanium compound.

The catalyst according to the invention can be produced by admixing the two compounds in an inert atmosphere at a temperature in the range of 0 to 100° C. The admixture may be aged, if desired, at the temperature for 0.5 to 5 hours, for example.

The 1,3-dienes to be cyclotrimerized by means of the present catalyst are, for example, butadiene, and methyl-substituted 1,3-butadiene such as isoprene, and pentadiene. The 1,3-diene can be subjected to cyclotrimerization in the form of a mixture thereof. For the butadiene, so-called "B-B cut" or "B-B fraction" containing butenes in addition to butadiene can be used. In a conventional cyclotrimerization catalyzed by a conventional catalyst, such a mixture in some cases cannot be utilized as the butadiene because the cyclotrimerization is less selective with respect to butadiene, and the butenes contained therein are also polymerized. However, the catalyst of the invention is much more selective.

The cyclotrimerization reaction catalyzed by this catalyst can be carried out in the presence or absence of a dispersing medium or solvent. Operation in the presence of a solvent, however, is preferable. Typical examples of the solvent are hydrocarbons such as benzene, toluene, xylene, and hexane. The reaction temperature is usually in the range of 0 to 100° C., and the reaction pressure is usually in the range of atmospheric to superatmospheric pressure.

Recovery of the cyclic trimer thus produced from the reaction product can be accomplished by means of any conventional procedure suitable therefor inclusive of, for example, distillation.

The following examples and reference examples are further illustrative of the nature and utility of this invention, it being understood that these are not intended to limit the scope of the invention. In these examples, abbreviations "Et," "Pr," "Bu," "AcAc," "Ph" and "i-" and "t-" mean "ethyl," "propy," "butyl," "acetylacetonate group," "phenyl," "iso," and "tertiary," respectively.

Example 1

Into an autoclave of 100-millilitre (ml.) capacity, 50 ml. of benzene, 1 millimole (mM.) of $TiO(Oi-Pr)_2$, 15 mM. of $AlEt_2Cl$, and 12 grammes (g.) of butadiene are charged in a nitrogen atmosphere. After agitation of the mixture at 40° C. for 20 hours (hrs.), a HCl-methanol solution is added thereto so as to decompose the catalyst, and an organic layer thus produced is subjected to distillation.

10.2 g. of cyclododecatriene (CDT)-(1,5,9) which is a fraction boiling at 65 to 70° C./3 mm. Hg is obtained, the yield being 85%.

Example 2

The procedure of Example 1 is followed except that to 50 ml. of xylene, 1 mM. of TiO (OPh)$_2$, 20 mM. of Al(i-Bu)$_2$Cl, and 12 g. of butadiene are added.

10.9 g. of CDT-(1,5,9) is obtained, the yield being 91%.

Example 3

The procedure of Example 1 is followed except that to 50 ml. of benzene, 1 mM. of TiO(OPr)$_2$, 8 mM. of AlEt$_2$Cl, and 12 g. of pentadiene are added.

3.8 g. of trimethylcyclodecatriene-(1,5,9) which is a fraction boiling at 85 to 105° C./mM. Hg is obtained, the yield being 32%.

Substitution of TiO(OPr)$_2$ by TiO(AcAc)$_2$ in this case gives a lower yield of 21%.

Example 4

The procedure of Example 1 is followed except that 50 ml. of benzene, 1 mM. of TiO(O-t-Bu)$_2$, 15 mM. of Al(i-Bu)$_2$Cl, and 12 g. of butadiene are added.

10.6 g. of CDT-(1,5,9) is obtained, the yield being 88%.

Example 5

The procedure of Example 1 is followed except that to 50 ml. of toluene, 1 mM. of TiO(O-t-Bu)$_2$, 10 mM. of AlEt$_2$Cl, and 12 g. of isoprene are added.

4.1 g. of trimethyl cyclododecatriene-(1,5,9) which is a fraction boiling at 80 to 100° C./2.5 mm. Hg is obtained, the yield being 34%.

Substitution of TiO(O-to-Bu)$_2$ by TiO(AcAc)$_2$ in this case gives a lower yield of 19%.

Example 6

The procedure of Example 1 is followed except that to 50 ml. of hexane, 1 mM. of TiOCl$_2$, 3 mM. of AlEt$_2$Cl, and 12 g. of isoprene are added.

4.3 g. of trimethyl cyclododecatriene-1,5,9 is obtained, the yield being 36%.

Substitution of TiOCl$_2$ by Tio(AcAc)$_2$ in this case gives a lower yield of 5%.

Example 7

The procedure of Example 1 is followed except that to 50 ml. of benzene, 1 mM. of TiOCl$_2$, 3 mM. of AlEt$_2$Cl, and 12 g. of butadiene are added.

11 g. of CDT-(1,5,9) is obtained, the yield being 92%.

Example 8

The procedure of Example 1 is followed except that to 50 ml. of benzene, 1 mM. of TiOBr$_2$, 5 mM. of Al(i-Bu)$_2$Cl, and 12 g. of butadiene are added.

10.4 g. of CDT-(1,5,9) is obtained, the yield being 87%.

Example 9

Into an autoclave of 100 ml. capacity, 400 ml. of benzene, 1 mM. of TiOCl$_2$, 3 mM. of AlEt$_2$Cl, and 14 g. of B-B cut are charged in a nitrogen atmosphere. After agitation of the mixture at 40° C. for 10 hrs., methanol solution is added thereto to decompose the catalyst, and the organic layer thus produced is subjected to distillation.

3.8 g. of CDT-(1,5,9) is obtained, the yield being 74%.

The composition of the B-B cut used is as follows:

| | Percent by weight |
|---|---|
| 1,3-butadiene | 35 |
| Butene-1 | 17 |
| Butene-2 | 8 |
| Isobutylene | 30 |
| Butane | 8 |

Example 10

The procedure of Example 9 is followed except that, as the catalyst components, 1 mM. of TiO(O-i-Pr)$_2$ and 10 mM. of AlEt$_2$Cl are used.

3.9 g. of CDT-(1,5,9) is obtained, the yield being 76%.

Reference Examples 1 and 2

The procedure of Example 9 is followed except that the titanyl compound is substituted by another titanium compound which is outside of the scope of the invention.

The results obtained are recorded in the following table.

| | Catalyst | | | | CDT-(1,5,9) produced | |
|---|---|---|---|---|---|---|
| Ex. No. | Ti compound | mM. | Al compound | mM. | Quantity (g.) | Yield, percent |
| Ref. Ex. 1 | TiCl$_4$ | 1 | AlEt$_2$Cl | 3 | 2.96 | 58 |
| Ref. Ex. 2 | Ti(OBu)$_2$Cl$_2$ | 1 | AlEt$_2$Cl | 3 | 2.85 | 56 |

I claim:
1. In a process for producing a cyclic trimer of an 1, 3-diene in which said 1,3-diene is brought into contact with a cyclotrimerization catalyst to produce a cyclic trimer thereof, the improvement which comprises bringing said 1,3-diene into contact with a catalyst consisting essentially of
   (1) a titanyl compound of the formula TiOX$_2$ wherein X is a member selected from the group consisting of halogens and OR groups wherein R is a member selected from the group consisting of lower alkyl groups, a phenyl group and a tolyl group and
   (2) a dialkylaluminum halide, the mole ratio of said titanyl compound (2) to said dialkylaluminum (1) being 1 to 50.

2. A process as claimed in claim 1 wherein said X is a member selected from the group consisting of chlorine and bromine.

3. A process as claimed in claim 1 wherein said X is a member selected from the group consisting of lower alkoxy and phenoxy groups.

4. A process as claimed in claim 1 wherein said dialkylaluminum halide is a diloweralkylaluminum halide.

5. A process as claimed in claim 1 wherein said dialkylaluminum halide is dialkylaluminum chloride.

6. A process as claimed in claim 1 wherein said 1,3-diene is a member selected from the group consisting of 1,3-butadiene and methyl-substituted 1,3-butadienes.

7. A process as claimed in claim 6 wherein said 1,3-butadiene is in admixture with butenes.

8. A process as claimed in claim 6 wherein said methyl-substituted 1,3-butadiene is a member selected from the group of consisting of isoprene and pentadiene.

9. A process for producing cyclododecatriene which comprises contacting, at 0° C. to 100° C., a 1,3-butadiene with a cyclotrimerization catalyst consisting essentially of
   (1) a titanyl compound of the formula TiOX$_2$ wherein X is a member selected from the group consisting of chlorine, bromine, a lower alkoxy group having 1 to 4 carbon atoms, and a phenoxy group and
   (2) a di(lower-alkyl) aluminum chloride, each of said lower alkyl groups having 1 to 4 carbon atoms, the mole ratio of said titanyl compound (2) to said dialkylaluminum (1) being 1 to 50.

References Cited

UNITED STATES PATENTS 3,280,205 10/1966 Yosida et al. _____ 260—666 B

FOREIGN PATENTS 1,325,966 7/1966 Japan _____ 260—666

OTHER REFERENCES

Chem. Abstracts, vol. 67, 53755 q. 1967 Abstract of Hiros, Takahasi, Osaka Koggs, Gijutsu Shi Kensho Hokcku, No. 325, 1–50 (1965).

DELBERT E. GANTZ, Primary Examiner

V. O'KEEFE, Assistant Examiner

U.S. Cl. X.R.

252—429, 431